R. H. F. SEWALL.
APPARATUS FOR DRIVING PILES.
APPLICATION FILED MAY 19, 1917.

1,267,129.

Patented May 21, 1918.
7 SHEETS—SHEET 1.

Fig. 1.

Witness
Edwin J Beller.

Inventor
R. H. F. Sewall,
by Wilkinson, Gneta & Mackaye,
Attorneys

Fig. 7.

R. H. F. SEWALL.
APPARATUS FOR DRIVING PILES.
APPLICATION FILED MAY 19, 1917.

1,267,129.

Patented May 21, 1918.
7 SHEETS—SHEET 5.

Witness
Edwin J Beller.

Inventor
R. H. F. Sewall,
by Wilkinson, Giusta & MacKaye,
Attorneys

UNITED STATES PATENT OFFICE.

ROBERT H. F. SEWALL, OF NEW ORLEANS, LOUISIANA.

APPARATUS FOR DRIVING PILES.

1,267,129.

Specification of Letters Patent.  Patented May 21, 1918.

Application filed May 19, 1917. Serial No. 169,672.

*To all whom it may concern:*

Be it known that I, ROBERT H. F. SEWALL, a citizen of the United States, residing at New Orleans, in the parish of Orleans and State of Louisiana, have invented certain new and useful Improvements in Apparatus for Driving Piles; and I do hereby declare the following to be a full, clear, and exact description of the invention, such as will enable others skilled in the art to which it appertains to make and use the same.

My present invention relates to improvements in apparatus for driving piles, and it is especially intended to provide an apparatus which will lessen the difficulty and expense of driving piles in deep water where there is a strong current, and to make it possible to drive and make a perfectly water tight wall below the surface of water where there are swift flowing currents.

My invention also comprises a special form of compound follower and also a special form of compound pile adapted to be driven by the apparatus hereinafter to be described.

My invention will be more fully understood by reference to the accompanying drawings, in which:

Fig. 15 is a front view; and Fig. 16 a plan view of the follower shown in section in Fig. 14;

Fig. 19 shows the wooden frame work before the concrete has been poured in;

Figure 2:
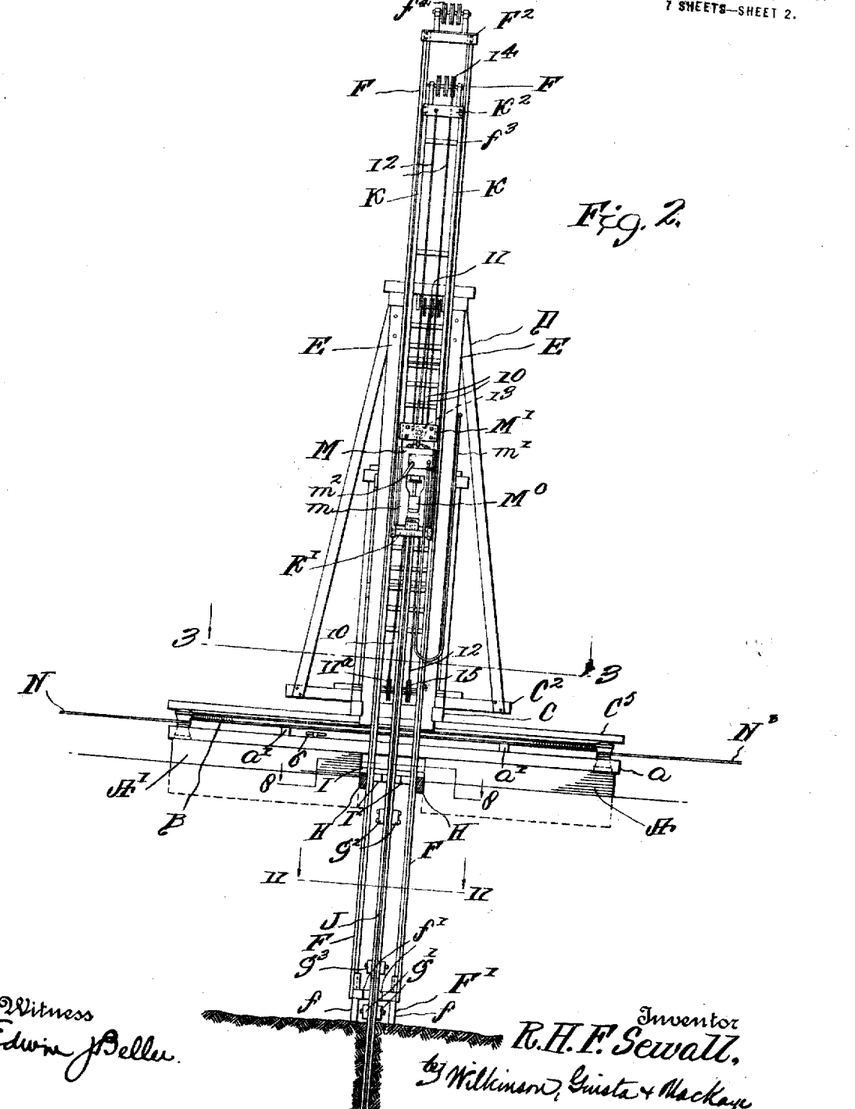
Fig. 2 is a front elevation, partly in section, along the line 2—2 of Fig. 1.
Figure 3:
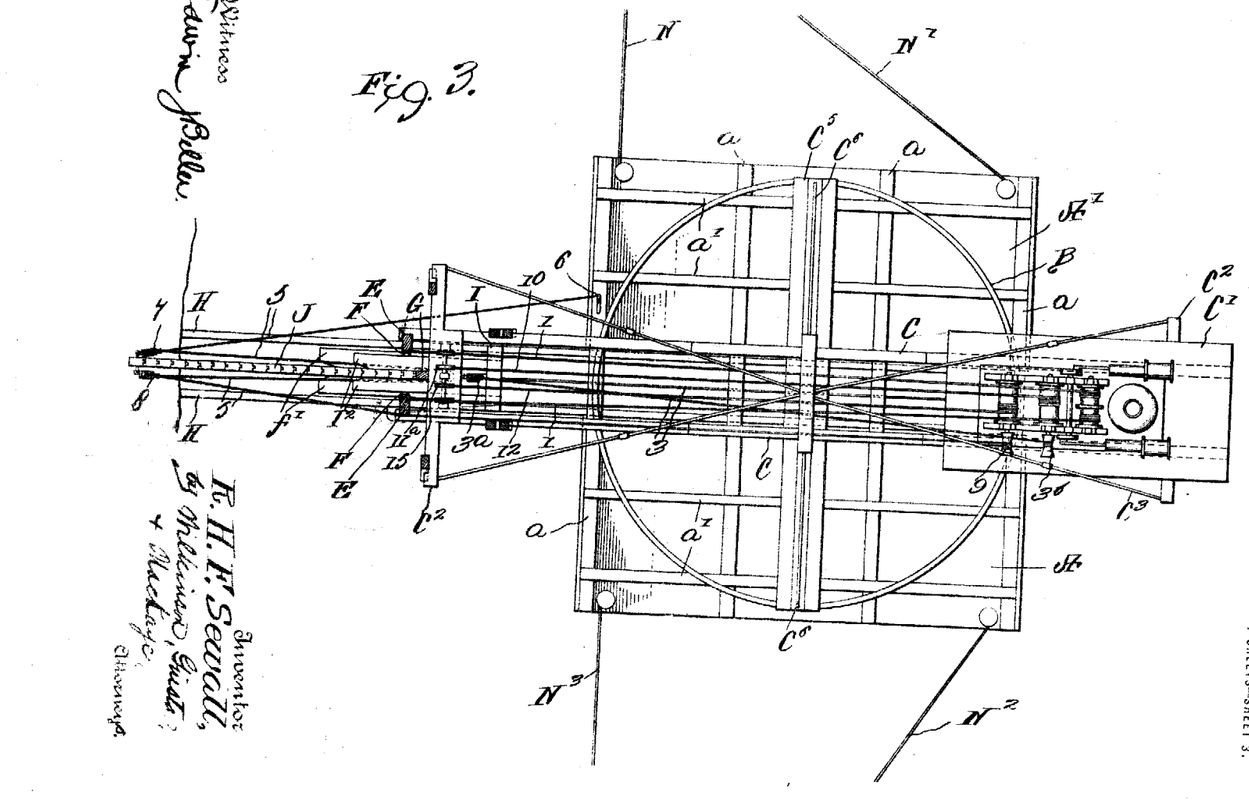
Fig. 3 shows a section through the apparatus along the line 3—3 of Fig. 2, and looking down.

The apparatus is all carried on two barges A and A' spaced apart, as shown in Figs. 2 and 3, and connected by transverse girders $a$, on which are mounted the fore and aft beams $a'$, which beams support the circular track B, on which the driving mechanism is mounted. This circular track is provided to form a turntable so that the driving apparatus may be operated from either end of the boat, as will be hereinafter more fully described.

Mounted above this turntable is a main frame C, carrying at its rear end the operating platform C', on which the hoisting engine, boiler, drums, etc., are mounted, while the forward end of this main frame carries the driving frame D, in which the hammer, leaders, and other members are mounted. The two ends of the main frame are provided with cross timbers $C^2$, connected together by rods or chains $C^3$, passing over the upright $C^4$ to prevent the ends of the frame from hogging.

Figure 1:
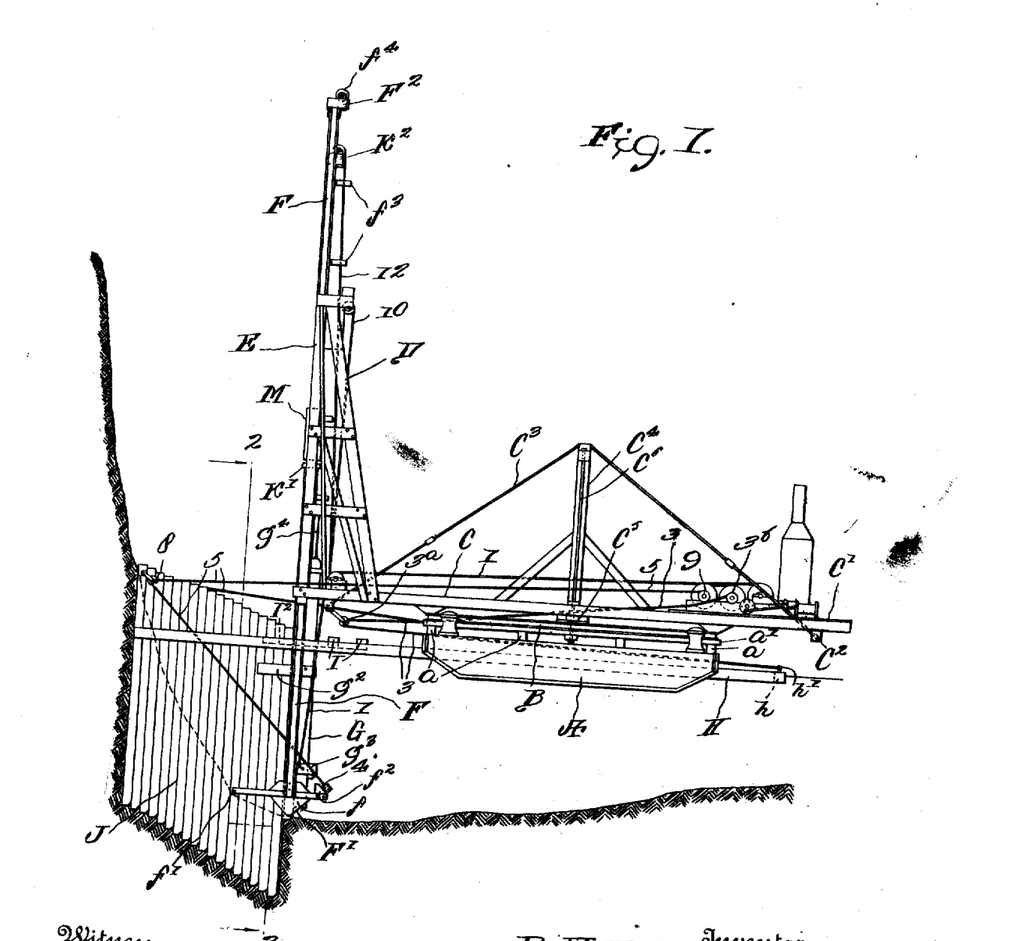
Figure 1 is a side elevation showing the apparatus driving piles in deep water, the level only of the water being shown, the symbol for water being omitted for the sake of clearness in the drawings.

This frame is braced laterally by the transverse beams $C^5$ and the tie rods or braces $C^6$. Mounted in the driving frame D are the fixed leaders E, which are preferably wooden timbers forming part of the driving frame D, and terminating just below the main frame, as shown in Figs. 1 and 2.

Slidably mounted inside of these fixed leaders E are the sliding leaders F, as shown most clearly in Figs. 5 to 8, which may be raised or lowered relative to the main leaders by means of any suitable hoisting device, such as the cable 1, connected to a suitable hoisting drum. These sliding leaders are raised or lowered so that the shoe F' carried by these sliding leaders may be raised or lowered corresponding to the depth of the water.

Figure 11:
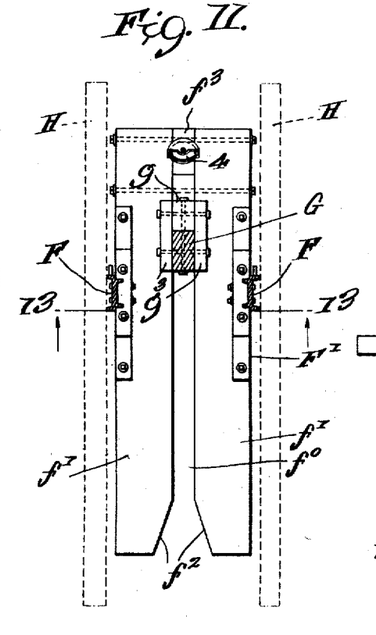
Fig. 11 shows a section along the line 11—11 of Fig. 2, and shows the construction of the shoe guiding the lower end of the pile, the stringers located at or near the water line being indicated in dotted lines, and the parts being shown on a larger scale than in Figs. 1 and 2.
Figure 12:
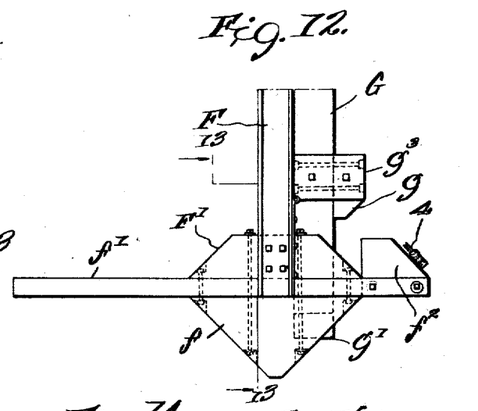
Fig. 12 is a side elevation of the parts shown in full lines in Fig. 11, as seen from the right of said figure.
Figure 13:
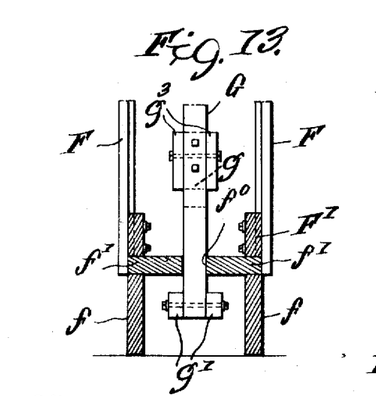
Fig. 13 shows a section along the line 13—13 of Figs. 11 and 12, and looking in the direction of the arrows.

This shoe F', as shown in Figs. 11, 12 and 13, is provided with supporting blocks $f$, adapted to rest on the bed of the stream and with guide pieces $f'$, which are spaced apart as at $f^0$ sufficiently to keep the piles J in alinement at the bottom of the stream. The forward end of this slot $f^0$ is flared outward as at $f^2$ for convenience in centering the shoe on the line of piling should for any cause the driver be disengaged from the work before completion.

Mounted at the rear of the slot $f^0$ of the shoe is a vertical timber G, which I call the buck, and which braces the inner edge of the pile being driven. This buck has a vertical play in the shoe which is limited by the blocks $g'$ below the shoe and the blocks $g^3$ above. It has a fore and aft play which is limited by the heel block $f^3$ and the piling when same is engaged in the shoe. When the shoe is lifted, the blocks $g^3$ will engage the shoe and the further lifting of the shoe will raise the buck also. This buck has attached to the upper end suitable tackle $g^4$ (see Fig. 1) for raising or lowering same and holding it in any desired position vertically as needed during the course of the work.

The buck near its head engages the front face of the main frame, and is held against being moved backward, thereby while below the main frame the buck carries guide arms $g^2$ to guide the upper parts of the piles J, when the inner hammer leaders are not being used.

Extending between the two boats are a pair of long stringers H, connected together at their rear ends by the cross piece h, to which the eye bolt $h'$ is secured. Connected to this eye bolt $h'$ is the cable 3, which leads over the snatch block $3^a$ to the winch $3^b$, and hauling on this cable will force the stringers forward relative to the barges, and when these stringers engage the bank, as shown in Fig. 1, hauling on the cable 3, will move the barges backward. These stringers are movable relative to the barges and preferably pass outside of the sliding leaders F. After the first few piles are driven, these stringers may be bolted to the driven piles.

Where a long stretch of piling is to be driven these stringers may be built of detachable sections, and sections may be added to the land end from time to time, as desired. In front of the barges these stringers are spaced apart by the filling blocks or frame, shown in Fig. 8, in which the cross pieces I carry the spacing blocks I' and the pile guides $I^2$. This frame is free to slide on the stringers. It is pulled backward by a suitable line made fast to the barges and thus so arranged as to be easily pulled out of the way of the hood K' at the base of the hammer leaders K when the said leaders are raised or lowered past the water line. This frame engages also the follower and guides same when the hood K' is working below water line.

The sliding leaders F are movable vertically between the stringers H and the guide pieces $I^2$.

The barges are pushed outward by hauling on the cable 3, as already described; but to hold the apparatus against the line of piling, I provide a sheave 4, carried by the shoe F', as shown in Figs. 1, 11 and 12, over which sheave passes the bight of a cable 5, one end of which cable is made fast to one of the barges as at 6, see Fig. 3. It then passes over a snatch block 7, secured in one side of the outer end of the line of piling, and then passes down around the sheave 4 and comes back over the snatch block 8 and is led back to the winch 9. Thus by turning on this winch 9, both barges and the shoe are drawn toward the line of piling and the buck is pressed firmly up against the inner edge of the pile being driven.

The sliding leaders F are connected together at the bottom by the shoe F', as already described, and at the top by a cross head $F^2$, and by intermediate braces $f^3$ thus constituting a sliding frame. On top of this cross head $F^2$ a plurality of pulleys $f^4$ may be provided for use with various hauling lines; but these pulleys form no essential part of the operative device.

Figure 5:
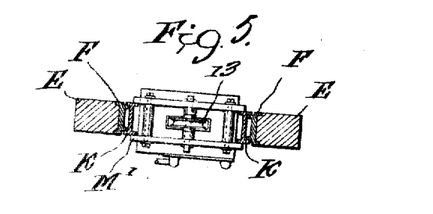
Fig. 5 shows a section along the line 5—5 of Fig. 4, and looking in the direction of the arrows.
Figure 6:
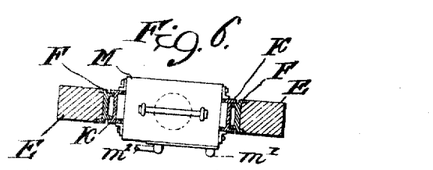
Fig. 6 shows a section along the line 6—6 of Fig. 4, and looking in the direction of the arrows.
Figure 7:
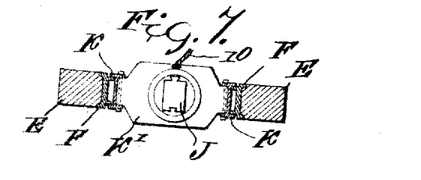
Fig. 7 shows a section along the line 7—7 of Fig. 4, and looking in the direction of the arrows.

Sliding within these leaders F are the hammer leaders K, which are connected at the bottom by the hood K', and at the top by the cross head $K^2$, which form an inner frame sliding inside the frame formed by the parts F, F' and F² already described. These hammer leaders are each preferably in the form of an I-beam, as shown in Figs. 5, 6, and 7, in which the outer flanges of the I-beam engage in the sliding leaders F and the inner flanges of the I-beam serve as guides for the hammer. Thus the weight of these inner leaders K, plus the weight of the hammer M, is on the head of the pile during driving.

This inner frame may be dispensed with when not driving the piles in deep water, and the hammer may be guided directly in the sliding leaders F, in which case either filling members would have to be provided, or a new hammer having a broader body portion may be used.

The hammer leaders may be raised and lowered by a cable 10, fast to the inner side of the hood, then passing upward over the sheave 11 carried by the frame D, and down under the pulley 11ª and back to a suitable hoisting drum.

Figure 4:
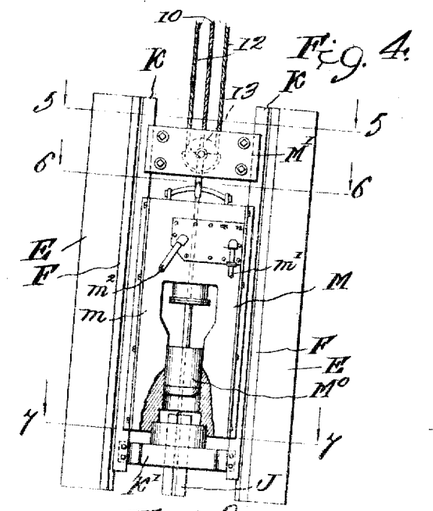
Fig. 4 is a front view of the steam hammer used in the apparatus, parts being broken away, the parts being drawn to a larger scale than Figs. 1 and 2.

I preferably use a steam hammer M, (see Figs. 2 and 4) having its body portion $m$ suspended from the sheave guide and casing M', which is raised or lowered by the cable 12. This cable is secured at one end to the cross head K² and passes under the sheave 13 and leads over the pulley 14, and thence down to the pulley 15 and back to a suitable hoisting drum. Thus the hammer leaders may be raised or lowered relative to the sliding leaders F, as required.

By having the sheave 13 mounted in a casing which is free to slide vertically but is prevented from sluing laterally, any twisting of the cable 12 is prevented, and it is insured against being cut by the sheave.

Steam is supplied the hammer engine through the hose $m'$; and this steam is exhausted through the pipe $m^2$. The hammer head is shown as at M⁰ in Figs. 2 and 4.

The barges are held in the desired position relative to the current of the stream by the usual lines N, N', N² and N³, passing around suitable winches.

Figure 8:
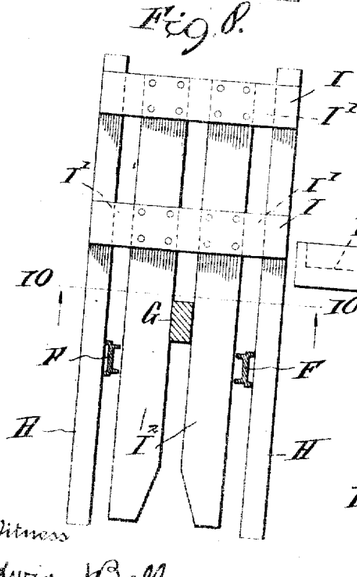
Fig. 8 shows a section along the line 8—8 of Fig. 2, looking down; and shows the guide frame for the piles near the surface of the water with the buck and outside telescoping parts shown in section, also a portion of the water line stringers.
Figure 9:
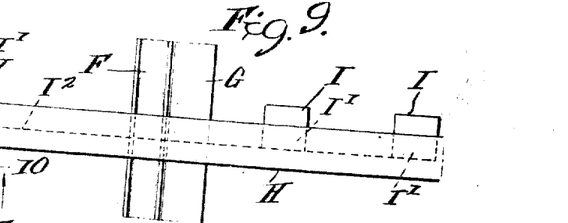
Fig. 9 shows a side view of the parts shown in Fig. 8.
Figure 10:
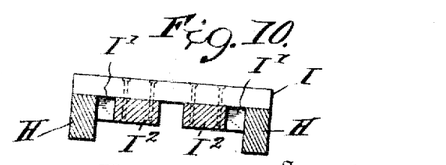
Fig. 10 shows a section along the line 10—10 of Fig. 8 and looking in the direction of the arrows.
Figure 18:
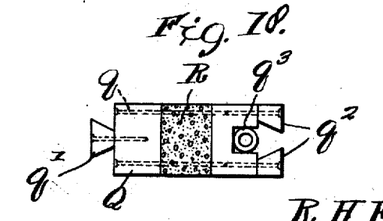
Fig. 18 is a plan view of this pile.

The apparatus is adapted for piles of any cross section; but I have shown it as especially applied to driving interlocking sheet piling having tongues projecting into corresponding dovetail grooves, as shown in Figs. 3 and 18.

Where round piles are to be driven, instead of the form of pile guides shown in Figs. 8 and 11, guides R (see Figs. 20–22) may be used, preferably in the form of inverted truncated cones attached to the bottom leaders F, whereby the points of the piles may be more conveniently guided when starting the pile down.

Figure 14:
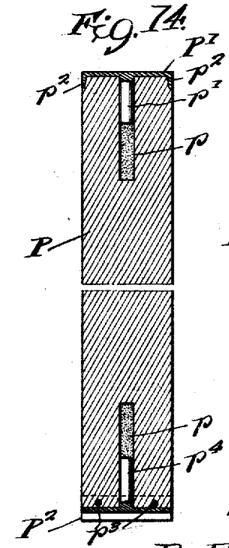
Fig. 14 shows a section of the follower adapted for driving the piles after their heads have been driven down to the surface of the water.
Figures 15, 16:
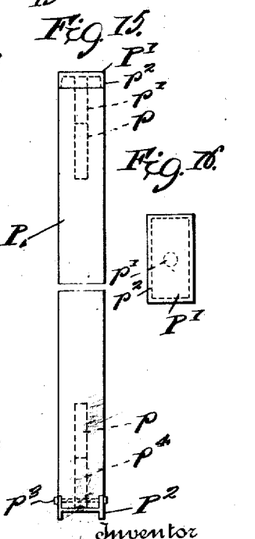

When the pile is to be driven with its head below the surface of the water, I provide a special form of follower, as shown in Figs. 14, 15 and 16, in which P represents the body of the follower, preferably made of a rectangular wooden timber having an axial socket $p$ in each end partly filled with sand or cement.

The upper end of the follower is provided with a cap P', having a tongue $p'$ projecting down into the socket $p$, and having downwardly projecting flanges $p^2$ on all sides thereof to prevent the top of the follower timber from splintering under the blows of the hammer. The follower is provided at its bottom with a shoe P² in the form of a short I-beam having its upper flanges secured to the body of the follower by means of the bolts $p^3$, and its lower flanges adapted to engage the sides of the pile. This form is especially adapted for sheet piling. Where round piles are to be used, a different form of follower shoe would, of course, be provided.

The shoe is also provided with a tongue $p^4$ projecting up into the corresponding socket $p$ in the follower. These tongues $p'$ and $p^4$, bearing upon non-yielding material, such as sand or concrete, will tend to distribute further into the body of the follower the effect of the blows imposed by the hammer, and to relieve the ends of the wooden body of the follower from injury. Moreover by having the follower protected at its ends with a metal cap, and having a wooden body portion, a more or less elastic medium is interposed between the hammer and the head of the pile, which will tend to relieve the shock of the hammer on the top of the pile, and will prevent the splintering or crushing of the head of the follower or of the pile.

Moreover, the weight of the metal shoe end of the cap, and also the weight of the material inclosed in the sockets $p$, will compensate for the buoyancy of the wooden body of the follower and cause it to sink more readily, which is especially desirable where the follower is being used in strong currents.

The lower end of the follower, when in use, is held by the flanges of the shoe on the top of the pile. The upper end passes through the guide $k$ in the hood K'. In order to use the follower, the pile is ordinarily driven down nearly to the surface of the water, and then the hammer is lifted and the follower is inserted in the hood with its shoe P² engaging the head of the pile; the hammer is then lowered to engage the cap of the follower, and the operation of driving is resumed.

Figure 17:
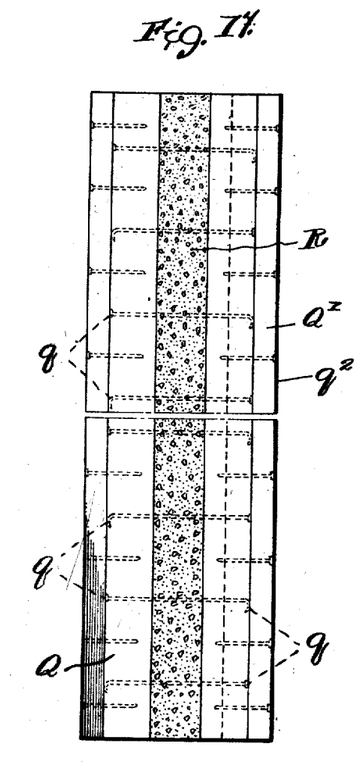
Fig. 17 shows a side elevation of a composite pile made of wooden frame work and cement and adapted for use in the apparatus.
Figure 19:
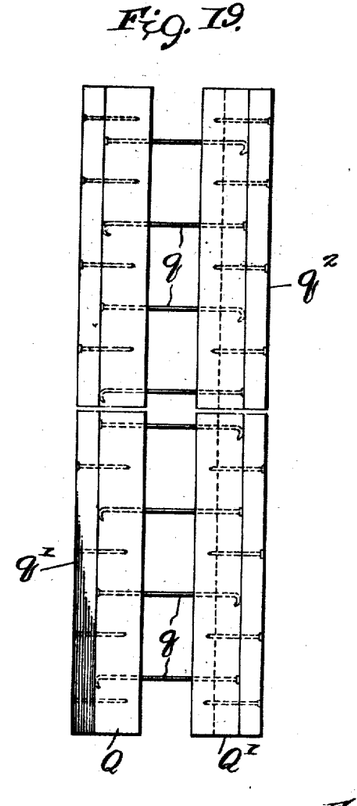

While the apparatus is suitable for driving any type of piles, it is especially adapted for driving in deep water, where strong currents prevail; and I have designed a special form of pile adapted for such purposes, shown in Figs. 17, 18 and 19. In this form of compound pile there are two wooden side beams Q and Q', spaced apart, as shown in Fig. 19, but connected together by tie bolts $q$. Secured to one of the side beams Q is a dovetail tenon $q'$ and secured to the side beam Q' are two pieces $q^2$ forming a dovetail groove adapted to receive a tenon, such as the tenon $q'$.

If it is desired to use hydraulic pressure in the driving of the pile, a pipe $q^3$, see Fig. 18, may be provided in a groove in the side beam Q', which pipe carries the water jet under pressure down to the bottom of the pile, and washes away the sand or mud beneath the same, as the pile is being driven.

After the frame of the pile has been prepared, as shown in Fig. 19, it is laid flat down on its side on any flat floor and concrete R is poured into the channel between the parts Q and Q', and when this concrete has sufficiently hardened the pile is ready for use. It will be seen that the bolts $q$ serve to reinforce this concrete, and at the same time hold all the parts of the pile together; and the use of the concrete increases the specific gravity of the pile so that there will be no tendency of the same to float in the water, which is a source of great trouble where long piles are being driven in deep water.

By this construction a heavy and durable pile is produced, the parts of which may be carried to the spot where the pile is needed, and there assembled, and thus saving expense not only in manufacture but also in transportation.

Moreover, with this form of compound pile the wooden side members protect the concrete core incident to the operation of driving, and will require no cushion block, as with the well known concrete pile; moreover this concrete core protects the timber and prevents it from splitting or brooming while together they impart the desired weight to the pile to overcome buoyancy, and furnish the requisite strength, toughness and resiliency to stand hard driving.

The operation of the device is as follows:

The barges are brought to the desired spot and are adjusted to the desired position by means of the lines N, N', N² and N³. The sliding leaders F are lowered to the position so that the shoe rests either on the bottom of the stream, or at the place on the edge of the stream where the first pile is to be driven; and the first pile is driven in the usual way. After the first few piles are driven, the snatch blocks 7 and 8 are secured in place, and the cable 5 is engaged thereover; and also it is passed over the pulley 4 on the shoe, and by hauling on this cable the main frame, together with the buck, are drawn in toward the line of piling.

At the same time, the stringers H are pressed in toward the bank by maintaining a slight tension on the cable 3.

As the driving of each pile is completed, the cable 5 is slacked up slightly and the cable 3 is hauled on until the barges are pushed out the requisite distance for driving the next pile.

As the channel gets deeper, the sliding leaders F are lowered, the shoe F' always resting on the bottom. As each pile is driven, it is guided by the guides provided in the shoe, and by the arms $g^2$ on the buck G, and by the blocks I², shown in Fig. 8, and the hood K' in Fig. 4.

When driving piles in this ordinary manner, with all heads above water, the buck G is down, so that the block $g$ is on a level with and against the face of heel block $f^3$ at all times.

When the piles are driven with their heads below water surface, the method is as follows:—

One pile X is driven as usual to the water line, the hammer is lifted and the driver moved outward one space. Pile Y is now entered with its tongue $q'$ engaging the slot $q^2$ (see Fig. 18) of pile X and driven to the same depth. The buck G (see Fig. 12) is then lifted until blocks $g'$ come in contact with the lower side of the shoe $f'$, thus releasing block $g$ from the face of heel block $f^2$. The pile driver is then moved inward over the driven work until the hammer comes over pile X and the heel block $f^2$ presses directly against the buck G,—holding piles X and Y both firmly against the line of piling J. The follower P is now inserted between the hood K' and the hammer M—the hammer is lowered on the follower when the whole weight of the leaders K and the hammer is resting on the head of the pile X which is driven to desired depth. The hammer leaders are then raised carrying the hammer and follower with it, the driver is moved outward two spaces, the buck G lowered until the block $g$ engages heel block $f^2$, which forces the buck one space nearer the line of piles, leaving one space for the entrance of pile Z, which is entered and the process repeated. By this method the head of the last pile inserted is always at the water surface where the foreman can see to properly insert the tongue in the groove. This is necessary as the tongue and groove are dovetailed and thus cannot be inserted from the front.

By this apparatus also, the follower P may ride continuously between the hood K' and the hammer M and need not be taken down and re-inserted for each pile, which in practice proves to be a great saving in time.

Where it is desired to drive in deep water, or especially where there is a heavy current, compound piles such as shown in Figs. 17 and 18 may be used.

After the piles have been driven out in the stream a sufficient distance, the outer telescoping leaders F may be raised, the shoe F' with buck G taken off of the leaders and replaced in the reverse position, the driving frame D can then be swung 180 degrees and the leaders lowered placing the shoe F' with the buck in proper position. The barges are then drawn in toward the bank straddling the work, the hauling lines properly adjusted and the driver is ready for driving the piling from the stream end of the barges toward the axis of the stream. Where there is a strong current, or rough water, or heavy driftwood, it would be often desirable for the barges to straddle the line of piling where there is, of course, very little current and practically no driftwood; and consequently the barges would be protected by so much of the line of piling as is already completed, and there would be very little of the apparatus exposed to the effects of the current, or the waves, or the driftwood referred to.

This feature of having the barges straddle the line of piling as far as already completed would also enable most of the apparatus to be kept out of the navigable channel of the stream; and in case the stream be narrow, this also would be of material advantage where there are boats passing.

Figure 20:
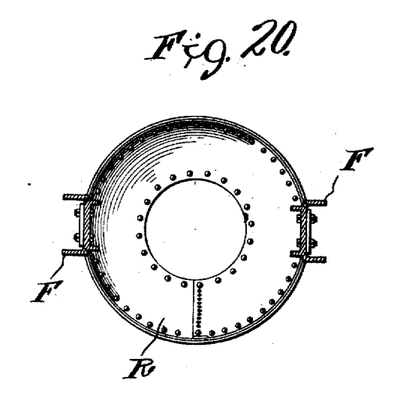
Fig. 20 is a plan view of a form of guide for round piles for use on the bottom leads of the pile driver when driving such pile.
Figure 21:
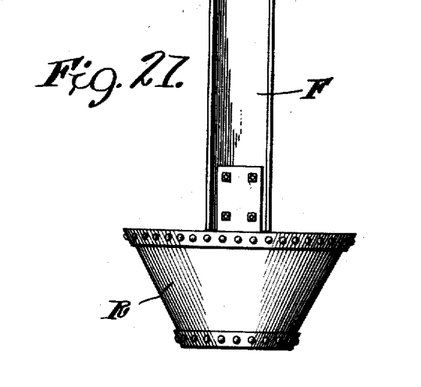
Fig. 21 is a side elevation.
Figure 22:
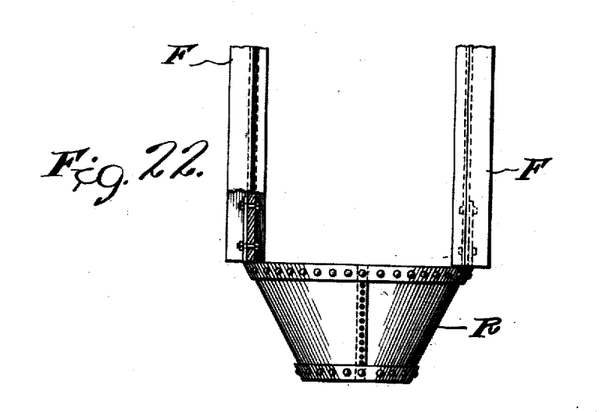
Fig. 22 is a front elevation of the guide shown in Fig. 20.

When it is desired to drive round piles with this apparatus, the shoe F', the buck G and the filler traveling frame I² are removed, and the guide R—illustrated in Figs. 20, 21 and 22—is bolted to the lower end of the telescoping leaders F in place of the shoe F'. When driving this base braces the leaders and guides the pile to the exact location required, and the driver is practically anchored to the bottom of the river where desired, the same as when driving sheet piling.

It will be obvious that various modifications might be made in the herein described apparatus, and in the construction, combination and arrangement of parts, which could be used without departing from the spirit of my invention.

Having thus described my invention, what I claim and desire to secure by Letters Patent of the United States is:

1. In pile driving apparatus, the combination with a pair of barges spaced apart, frame work mounted on said barges, and a pile driver carried by said frame work and adapted to drive line piling in line with the open space between said barges, of a pair of stringers mounted between said barges and adapted to straddle the line of piling, with means for moving the barges longitudinally relative to said stringers, substantially as described.

2. In pile driving apparatus, the combination with a pair of barges spaced apart, frame work mounted on said barges, and a pile driver carried by said frame work and adapted to drive line piling in line with the open space between said barges, of a pair of stringers mounted between said barges and adapted to straddle the line of piling, a hauling line connected to said stringers, and means carried by said frame work for hauling on said hauling line, substantially as described.

3. In pile driving apparatus, the combination with a pair of barges spaced apart, a turntable mounted on said barges, frame work mounted over said turntable and adapted to be rotated through 180° thereon, and a pile driver carried by said frame work and adapted to drive line piling in line with the open space between said barges, of a pair of stringers mounted between said barges and adapted to straddle the line of piling, with means for moving the barges in or out relative to said stringers, substantially as described.

4. In pile driving apparatus, the combination with a pair of barges spaced apart, a turntable mounted on said barges, frame work mounted over said turntable and adapted to be rotated through 180° thereon, and a pile driver carried by said frame work and adapted to drive line piling in line with the open space between said barges, of a pair of stringers mounted between said barges and adapted to straddle the line of piling, a hauling line connected to said stringers, and means carried by said frame work for hauling on said hauling line, substantially as described.

5. In pile driving apparatus, the combination with a pair of barges spaced apart, frame work mounted on said barges, and a pile driver carried by said frame work and adapted to drive line piling in line with the open space between said barges, of a pair of stringers mounted between said barges and adapted to straddle the line of piling, a guide frame for the piles being driven slidably mounted on said stringers, and means for moving the barges longitudinally relative to said stringers, substantially as described.

6. In pile driving apparatus, the combination with a pair of barges spaced apart, frame work mounted on said barges, and a pile driver carried by said frame work and adapted to drive line piling in line with the open space between said barges, of a pair of stringers mounted between said barges and adapted to straddle the line of piling, a guide frame for the piles being driven slidably mounted on said stringers, a hauling line connected to said stringers, and means carried by said frame work for hauling on said hauling line, substantially as described.

7. In pile driving apparatus, the combination with a pair of barges spaced apart, of a pair of stringers mounted between said barges and adapted to straddle the line of piling, frame work mounted on said barges, a pile driver carried by said frame work provided with leaders projecting downward between said stringers in line with the open space between said barges, and means for moving the barges longitudinally relative to said stringers, substantially as described.

8. In pile driving apparatus, the combination with a pair of barges spaced apart, of a pair of stringers mounted between said barges and adapted to straddle the line of piling, frame work mounted on said barges, a pile driver carried by said frame work provided with leaders projecting downward between said stringers in line with the open space between said barges, a hauling line connected to said stringers, and means carried by said frame work for hauling on said hauling line, substantially as described.

9. In pile driving apparatus, the combination with a pair of barges spaced apart, of a pair of stringers mounted between said barges and adapted to straddle the line of piling, frame work mounted on said barges, a pile driver carried by said frame work provided with leaders projecting downward between said stringers in line with the open space between said barges, a guide frame for the piles being driven slidably mounted on said stringers, and means for moving the barges longitudinally relative to said stringers, substantially as described.

10. In pile driving apparatus, the combination with a pair of barges spaced apart, of a pair of stringers mounted between said barges and adapted to straddle the line of piling, frame work mounted on said barges, a pile driver carried by said frame work provided with leaders projecting downward between said stringers in line with the open space between said barges, a guide frame for the piles being driven slidably mounted on said stringers, a hauling line connected to said stringers, and means carried by said frame work for hauling on said hauling line, substantially as described.

11. In pile driving apparatus, the combination with a pair of barges spaced apart, of a pair of stringers mounted between said barges and adapted to straddle the line of piling, frame work mounted on said barges, a pile driver carried by said frame work provided with leaders projecting downward between said stringers in line with the open space between said barges, a shoe carried by the lower end of said leaders, a guide for the piles carried by said shoe, and means for moving the barges longitudinally relative to said stringers, substantially as described.

12. In pile driving apparatus, the combination with a pair of barges spaced apart, of a pair of stringers mounted between said barges and adapted to straddle the line of piling, frame work mounted on said barges, a pile driver carried by said frame work provided with leaders projecting downward between said stringers in line with the open space between said barges, a shoe carried by the lower end of said leaders, a guide for the piles carried by said shoe, a hauling line connected to said stringers, and means carried by said frame work for hauling on said hauling line, substantially as described.

13. In pile driving apparatus, the combination with a pair of barges spaced apart, of a pair of stringers mounted between said barges and adapted to straddle the line of piling, frame work mounted on said barges, a pile driver carried by said frame work provided with leaders projecting downward between said stringers in line with the open space between said barges, a guide frame for the piles being driven slidably mounted on said stringers, a buck passing through said guide frame and held against the outer edge of the pile being driven, guide arms projecting from said buck and engaging both sides of the line of piling, means for raising and lowering said buck, and means for moving the barges longitudinally relative to said stringers, substantially as described.

14. In pile driving apparatus, the combination with a pair of barges spaced apart, of a pair of stringers mounted between said barges and adapted to straddle the line of piling, frame work mounted on said barges, a pile driver carried by said frame work provided with leaders projecting downward between said stringers in line with the open space between said barges, a guide frame for the piles being driven slidably mounted on said stringers, a buck passing through said guide frame, and held against the outer edge of the pile being driven, guide arms projecting from said buck and engaging both sides of the line of piling, means for raising and lowering said buck, a hauling line connected to said stringers, and means carried by said frame work for hauling on said hauling line, substantially as described.

15. In pile driving apparatus, the combination with a pair of barges spaced apart, of a pair of stringers mounted between said barges and adapted to straddle the line of piling, frame work mounted on said barges, a pile driver carried by said frame work provided with leaders projecting downward between said stringers in line with the open space between said barges, a shoe carried by the lower end of said leaders, a guide for the piles carried by said shoe, a buck passing through said guide frame and through said shoe and held against the outer edge of the pile being driven, guide arms projecting from said buck and engaging both sides of the line of piling, blocks on said buck above and below said shoe limiting the vertical movement of said buck relative to said shoe, and means for moving the barges longitudinally relative to said stringers, substantially as described.

16. In pile driving apparatus, the combination with a pair of barges spaced apart, of a pair of stringers mounted between said barges and adapted to straddle the line of piling, frame work mounted on said barges, a pile driver carried by said frame work provided with leaders projecting downward between said stringers in line with the open space between said barges, a shoe carried by the lower end of said leaders, a guide for the piles carried by said shoe, a buck passing through said guide frame and through said shoe and held against the outer edge of the pile being driven, guide arms projecting from said buck and engaging both sides of the line of piling, blocks on said buck above and below said shoe limiting the vertical movement of said buck relative to said shoe, a hauling line connected to said stringers, and means carried by said frame work for hauling on said hauling line, substantially as described.

17. In pile driving apparatus, the combination with a pair of barges spaced apart, of a pair of stringers mounted between said barges and adapted to straddle the line of piling, a pile driver carried by said frame work provided with a series of telescopic leaders projecting downward between said stringers in line with the open space between said barges, and means for moving the barges longitudinally relative to said stringers, substantially as described.

18. In pile driving apparatus, the combination with a pair of barges spaced apart, of a pair of stringers mounted between said barges and adapted to straddle the line of piling, frame work mounted on said barges, a pile driver carried by said frame work provided with fixed leaders and telescopic leaders mounted inside of said fixed leaders and projecting downward between said stringers in line with the open space between said barges, substantially as described.

19. In a pile driving apparatus, the combination with a frame and fixed leaders carried thereby, of telescopic leaders mounted inside said fixed leaders, a shoe provided with guides for the pile carried at the end of one pair of said telescopic leaders, and a hammer mounted between said telescopic leaders, with a buck passing through said shoe and held against the outer edge of the pile being driven, substantially as described.

20. In a pile driving apparatus, the combination with a frame and fixed leaders carried thereby, of two pairs of telescopic leaders mounted inside said fixed leaders, a shoe provided with guides for the pile carried at the end of the outer pair of said telescopic leaders, and a hammer mounted between the inner pair of said telescopic leaders, with a buck passing through said shoe and held against the outer edge of the pile being driven, substantially as described.

21. In a pile driving apparatus, the combination with a frame and fixed leaders carried thereby, of two pairs of telescopic leaders mounted inside of said fixed leaders, means for guiding the lower end of the pile carried by the outer pair of said telescopic leaders, a hood carried by the inner pair of telescopic leaders and adapted to serve as a guide for the pile and the follower, and a hammer slidably mounted between the inner leaders above said hood, substantially as described.

22. In a pile driving apparatus, the combination with a frame and fixed leaders carried thereby, of two pairs of telescopic leaders mounted inside of said fixed leaders, means for guiding the lower end of the pile carried by the outer pair of said telescopic leaders, a hood carried by the inner pair of telescopic leaders and adapted to serve as a guide for the pile and the follower, and a hammer slidably mounted between the inner leaders above said hood, with a sheave guide for the hammer hoist slidably mounted between the inner leaders above said hammer, substantially as described.

In testimony whereof, I affix my signature.

ROBERT H. F. SEWALL.